(12) United States Patent
Fujikawa

(10) Patent No.: US 8,228,446 B2
(45) Date of Patent: Jul. 24, 2012

(54) COMPONENT ASSEMBLY AND ELECTRONIC APPARATUS

(75) Inventor: Hideyuki Fujikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1008 days.

(21) Appl. No.: 12/222,961

(22) Filed: Aug. 20, 2008

(65) Prior Publication Data
US 2009/0141199 A1 Jun. 4, 2009

(30) Foreign Application Priority Data
Nov. 29, 2007 (JP) .................................. 2007-308875

(51) Int. Cl.
*H04N 7/18* (2006.01)
(52) U.S. Cl. ........................................ 348/836; 348/843
(58) Field of Classification Search ........... 348/836–843
See application file for complete search history.

(56) References Cited

U.S. PATENT DOCUMENTS
6,352,322 B1   3/2002  Nakao
7,965,344 B2 * 6/2011  Wang et al. ................... 348/826

FOREIGN PATENT DOCUMENTS

| JP | 60-6273 | 1/1985 |
|---|---|---|
| JP | 05-59682 | 8/1993 |
| JP | 8-334107 | 12/1996 |
| JP | 10-153204 | 6/1998 |
| JP | 2002-170168 | 6/2002 |
| WO | WO99/10860 | 3/1999 |

OTHER PUBLICATIONS

Japanese Office Action dated May 25, 2010 and issued in corresponding Japanese Patent Application 2007-308875.

* cited by examiner

*Primary Examiner* — Andy Rao
(74) *Attorney, Agent, or Firm* — Staas & Halsey LLP

(57) ABSTRACT

A component assembly includes a first component having a locking section and a flat-plate shaped projection formed on a first face. The locking section extends from the first face and bends in a first direction. The projection extends perpendicularly to the first face and is formed of a face intersecting the first direction. The assembly also includes a second component having a first hole and a second formed on a first face. The locking section of the first component is inserted into the first hole, and the projection of the first component is inserted into the second hole. The first face of the second component opposes the first face of the first component and includes a part with a slope section on which the distal end of the projection abuts and which moves the first component in the first direction when the first component is attached to the second component.

12 Claims, 21 Drawing Sheets

COMPONENT ASSEMBLY AND ELECTRONIC APPARATUS

BACKGROUND OF THE INVENTION

1. Field of the Invention

The present invention relates to a component assembly in which plural components are assembled and an electronic apparatus a part of the housing of which is formed of the component assembly.

2. Description of the Related Art

There have been demands for electronic apparatus such as a personal computer and a cellular phone satisfying user friendliness and functionality, however, industrial design is also an important factor for selection for a user. Typically, electronic components are attached to a strong metallic housing frame to prevent the electronic components from being damaged by shock or the like. The housing frame is covered with a plastic cover to improve appearance.

At the time of repair, however, the cover is removed from the housing frame and then the cover is attached again to the housing frame. At this point, if a screw is forcibly fastened into a wrong screw hole, the cover may be damaged, appearance may be marred or an interstice may be formed between the cover and the housing frame, through which moisture or dust enter to cause a failure. In order to avoid such an inconvenience, in general, the cover is first tentatively fixed to the housing frame and then the cover is fixed to the housing frame with a screw at the time of attaching the cover to the housing frame. As methods of tentatively fixing the cover to the housing frame, there have been generally utilized a technique (refer to WO99/10860) in which the battery cover of a cellular phone is detachably attached to the housing of a main body and a technique (refer to Japanese Patent Application Publication No. 05-59682) in which the cover of a recording cartridge such as a video tape is opened or closed to engage a prong or a protrusion provided on the cover with a locking hole or a recess provided on the housing frame. Three conventional methods of fixing a cover are described below.

FIG. 1 is a schematic diagram describing a first method of fixing a cover to a housing frame.

In the cover fixing method in FIG. 1, a protrusion 511a provided on a cover 511 is fitted into the recess of the housing frame 512 to tentatively fix the cover to the housing frame 512 and then the cover 511 is fastened with a screw 515 from the other side thereof. In addition, resin components 513 and 514 made of the same resin as the cover 511 are fixed to the housing frame 512 by integral molding. The resin components 513 and 514 and the cover 511 conceal electronic components and the housing frame 512. The cover fixing method can easily attach the cover 511 to the housing frame 512 while avoiding an erroneous attachment, however, has a problem in that it takes cost and time to fix the resin components 513 and 514 to the housing frame 512 or to dismantle the resin components 513 and 514 at the time of a recycling work and the method is inflexible and thus cannot support variations of the cover 511.

FIG. 2 is a schematic diagram describing a second method of fixing a cover to a housing frame.

A cover 521 is provided with a hook 521a and a pawl 521b and the housing frame 522 is provided with locking holes at positions corresponding to the hook 521a and the pawl 521b respectively. As illustrated in Part (A) of FIG. 2, the hook 521a and the pawl 521b of the cover 521 are engaged with the locking holes of the housing frame 522 respectively to tentatively fix the cover 521 to the housing frame 522, thereafter, the cover 521 is fixed to the housing frame 522 with a screw.

The cover fixing method illustrated in FIG. 2 can tentatively fix the cover 521 to the housing frame 522 while suppressing a cost. However, as illustrated in Part (B) of FIG. 2, the method has a problem in that the pawl 521b may be broken when the cover is removed from the housing frame 522 and therefore the cover 521 cannot be repetitively attached and detached.

FIG. 3 is a schematic diagram describing a third method of fixing a cover to a housing frame.

A cover 531 illustrated in FIG. 3 is provided with a hook 531a which is the same as the hook 521a in FIG. 2. A protrusion 531b is provided instead of the pawl 521b illustrated in FIG. 2. Furthermore, the cover 531 is provided with an auxiliary pawl 531c on a wall on the same side as the hook 531a. The use of the protrusion 531b makes engagement weaker than that of the pawl 521b illustrated in FIG. 2, thereby making it easier to remove the cover 521 from the housing frame 522. Even if the engagement by the protrusion 531b is released, the auxiliary pawl 531c hooks the housing frame 532 to surely tentatively fix the cover 531. As illustrated in Part (B) of FIG. 3, however, while the cover 531 is repetitively detached, the corners of the auxiliary pawl 531c are worn down to weaken the engagement of the auxiliary pawl 531c. As illustrated in Part (C) of FIG. 3, even when the hook 531a is not correctly engaged with the housing frame 532, the cover 531 can be forcibly but incorrectly fixed to the housing frame 532 with a screw by the elastic deformation of the cover 531.

As described above, the conventional cover fixing methods have problems in that they are costly, removing the cover only several times damages the cover and the cover can be fixed to the housing frame with a screw with the cover not correctly attached. In recent years, electronic apparatus are available in which a user may select a cover with his/her preferred color or appearance from among several kinds of covers. In future, it is assumed that the replacement of a cover will be common. As is clear from the above, the development of a cover and a housing frame is demanded which are easily and repetitively detachable.

SUMMARY OF THE INVENTION

The present invention has been made in view of the above circumstances and provides a component assembly and an electronic apparatus in which a cover can be repetitively attached to a housing frame or detached therefrom while suppressing increase in cost.

A component assembly according to the present invention includes:

a first component including a locking section and a flat-plate shaped projection which are formed on a first surface of the first component, the locking section extending from the first face and bending in a first direction, and the projection extending perpendicularly to the first face and formed of a face intersecting the first direction; and a second component including a first hole and a second hole which are formed on a first face of the second component, the first hole into which the locking section of the first component is inserted and locked, and the second hole into which the projection of the first component is inserted, the first face of the second component opposing the first face of the first component and including a part with a slope section on which a distal end of the projection of the first component abuts and which moves the first component in the first direction when the first component is attached to the second component.

According to the basic feature of the component assembly, when a first component is attached to a second component, the distal end of a projection of the first component abuts on the slope section of the first component to move the first component in a first direction, and as a result, a locking section of the first component is locked by a first hole of the second component to attach the first component to the second component. Therefore, an excessive stress applied to the locking section and the projection when the first component is attached or detached to and from the second component can be reduced to prevent the locking section and the projection of the first component from being damaged or worn out. Furthermore, according to the basic feature of the component assembly of the present invention, the direction and the position of a pawl and a projection provided on a conventional housing frame or cover are merely changed to eliminate the need for preparing a new component, thereby suppressing increase in cost and enabling attachment and detachment of the first component to and from the second component repetitively.

It is preferable, in addition to the basic feature of the component assembly, that the distal end of the projection of the first component has a slope section in such a shape that the slope section rubs on the slope section of the second component when the first component is attached to the second component.

According to this additional feature of the component assembly, friction can be reduced between the slope section of the second component and the distal end of the projection of the first component to enable smooth attachment and detachment of the first component to and from the second component.

It is also preferable, in addition to the basic feature of the component assembly, that the second hole is larger in size than the projection of the first component, and the part of the second component has a portion which regulates the movement of the projection against the entering of the projection of the first component from a predetermined direction.

According to this preferable additional feature of the present invention, the projection of the first component can be easily inserted into the second hole of the second component, and if the projection is inserted from a wrong direction, the movement of the projection is regulated to prevent a wrong attachment.

In the additional feature of the second hole being larger in size than the projection of the first component, it is preferable that the second component includes a second face which makes a predetermined angle with the first face of the second component and follows the first face, and the second hole extends to the first and the second faces of the second component.

The second hole extending to the first and the second face is provided on the second component to allow the projection of the first component to be easily inserted thereinto.

It is also preferable, in addition to the basic feature of the component assembly, that the first component includes a second face which makes a predetermined angle with the first face of the first component and follows the first face and a protrusion which protrudes toward the inside of the second face, and the second component includes a second face which makes the same angle as the predetermined angle of the first component and follows the first face and a recess which is formed on the second face of the second component and in which the protrusion formed on the second face of the first component is engaged when the first component is attached to the second component.

According to this preferable additional feature of the present invention, when the first component is attached to the second component, the protrusion formed on the first component is fitted to the recess formed on the second component to surely fix the first component to the second component.

In this additional feature of the first component having the protrusion and the second component having the recess, it is further preferable that the first component includes a screw insertion hole in the second face of the first component, and the second component includes a screw hole at a position in the second face of the second component corresponding to the screw insertion hole of the first component.

If the first component is incorrectly attached to the second component, the second face of the first component is not parallel to the second face of the second component, so that the screw insertion hole of the first component and the screw hole of the second component are out of alignment. For this reason, according to the additional feature, the wrong attachment between the first and the second components can be prevented.

The second faces of the first and the second components may correspond to the bottom face of an electronic apparatus and the like. Forming the screw insertion hole and the screw hole in the second faces of the first and the second components allows fixing the first component to the second component with screws on the bottom face which is inconspicuous.

It is also preferable, in addition to the basic feature of the component assembly, that the first component further includes a second face which makes a predetermined angle with the first face of the first component and follows the first face, and the first component also includes, in addition to the projection, a supporting section which projects toward the inside of the second face to support the projection.

The projection provided on the first component abuts the part provided on the first face of the second component when the first component is attached to the second component, so that the projection is supported by the supporting section from the second face side to increase the strength of the projection without interfering with the attachment and detachment of the first component.

It is also preferable, in addition to the basic feature of the component assembly, that the second component includes a third hole, through which a third component appears, in the first face of the second component, and the first component includes a hole at a position in the first face of the first component corresponding to the third hole when the first component is attached to the second component.

According to this additional feature, for example, the third component such as a switch is housed inside the first and the second components and the third component can be exposed to the outside through the holes formed in the first and the second components.

It is also preferable, in addition to the basic feature of the component assembly, that the first component is made of resin, and the second component is made of metal.

As for the component assembly formed of a resin component and a metal component is repetitively attached and detached, the resin component which is low in strength wears out more quickly. According to the basic feature of the component assembly, the wearing-out of the locking section and the projection of the first component is reduced, so that even if the first component is made of resin, the first component can be repetitively attached to the second component and detached therefrom.

An electronic apparatus according to the invention includes:

the component assembly, which has the above-described basic feature and any of the above-described additional features, as part of the housing of the electronic apparatus,
wherein the second component is a housing frame, and
the first component is a cover fixed to the housing frame.

In electronic apparatus such as a personal computer, it is presumed that a cover is repetitively attached to or detached from the housing frame. According to the basic feature of the electronic apparatus, a cover can be repetitively attached to a housing frame or detached therefrom while suppressing increase in cost.

As described above, according to the component assembly and the electronic apparatus of the present invention, a cover can be repetitively attached to a housing frame or detached therefrom while suppressing increase in cost.

DETAILED DESCRIPTION OF THE INVENTION

A concrete embodiment of the component assembly and the electronic apparatus will be described below with reference to the drawings.

Figure 1:
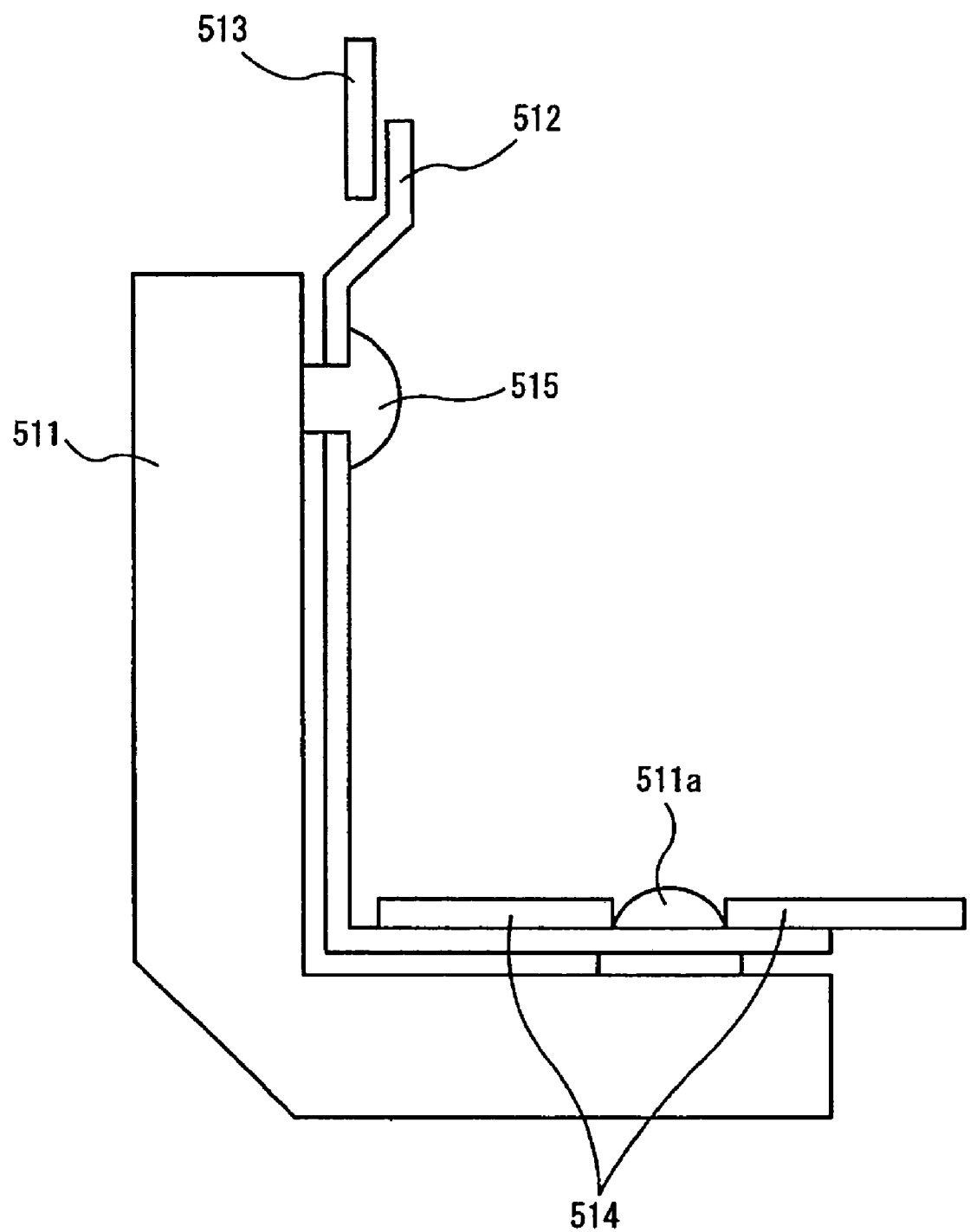
FIG. 1 is a schematic diagram describing a first method of fixing a cover to a housing frame.
Figure 2:
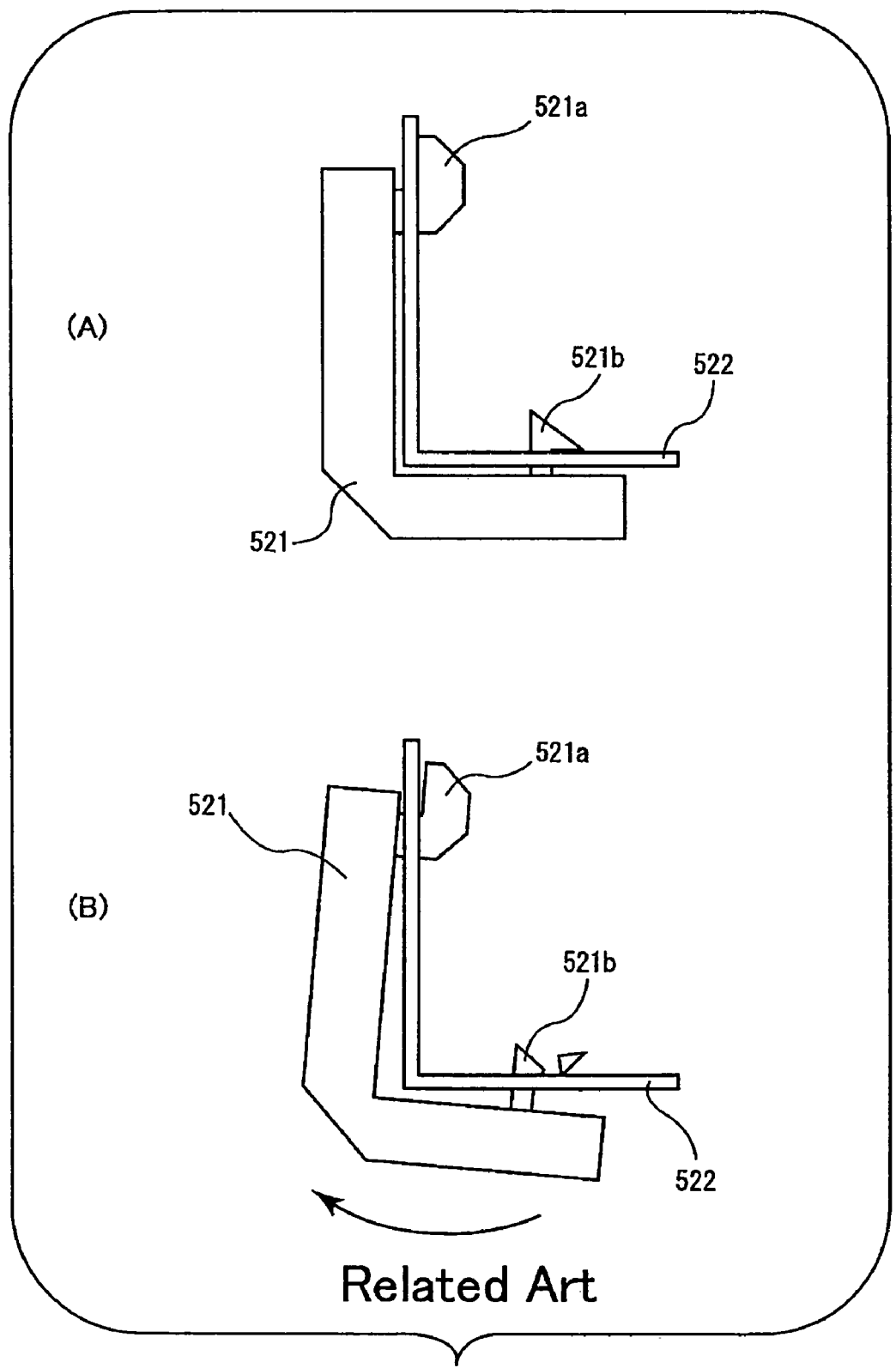
FIG. 2 is a schematic diagram describing a second method of fixing a cover to a housing frame.
Figure 3:
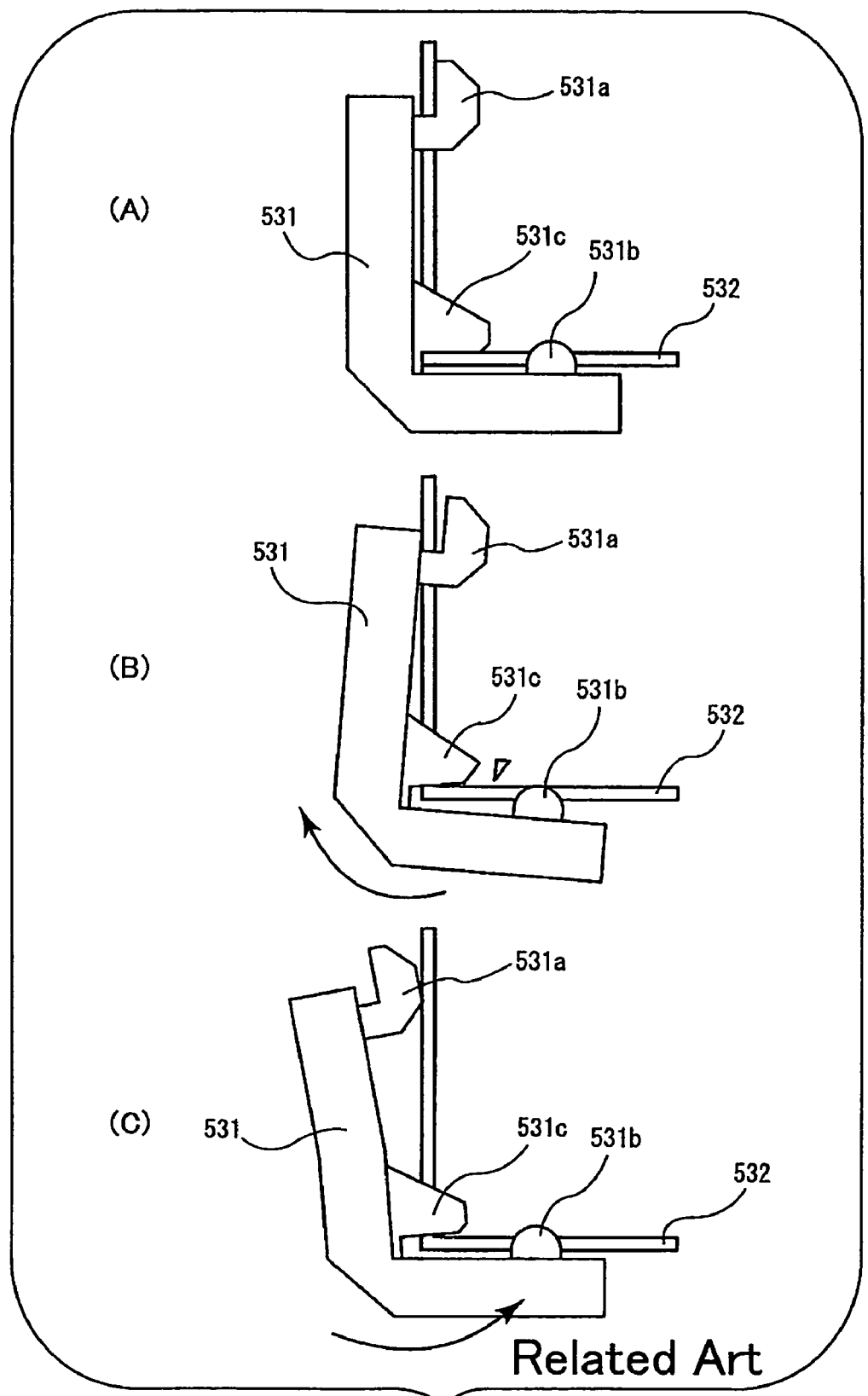
FIG. 3 is a schematic diagram describing a third method of fixing a cover to a housing frame.
Figure 4:
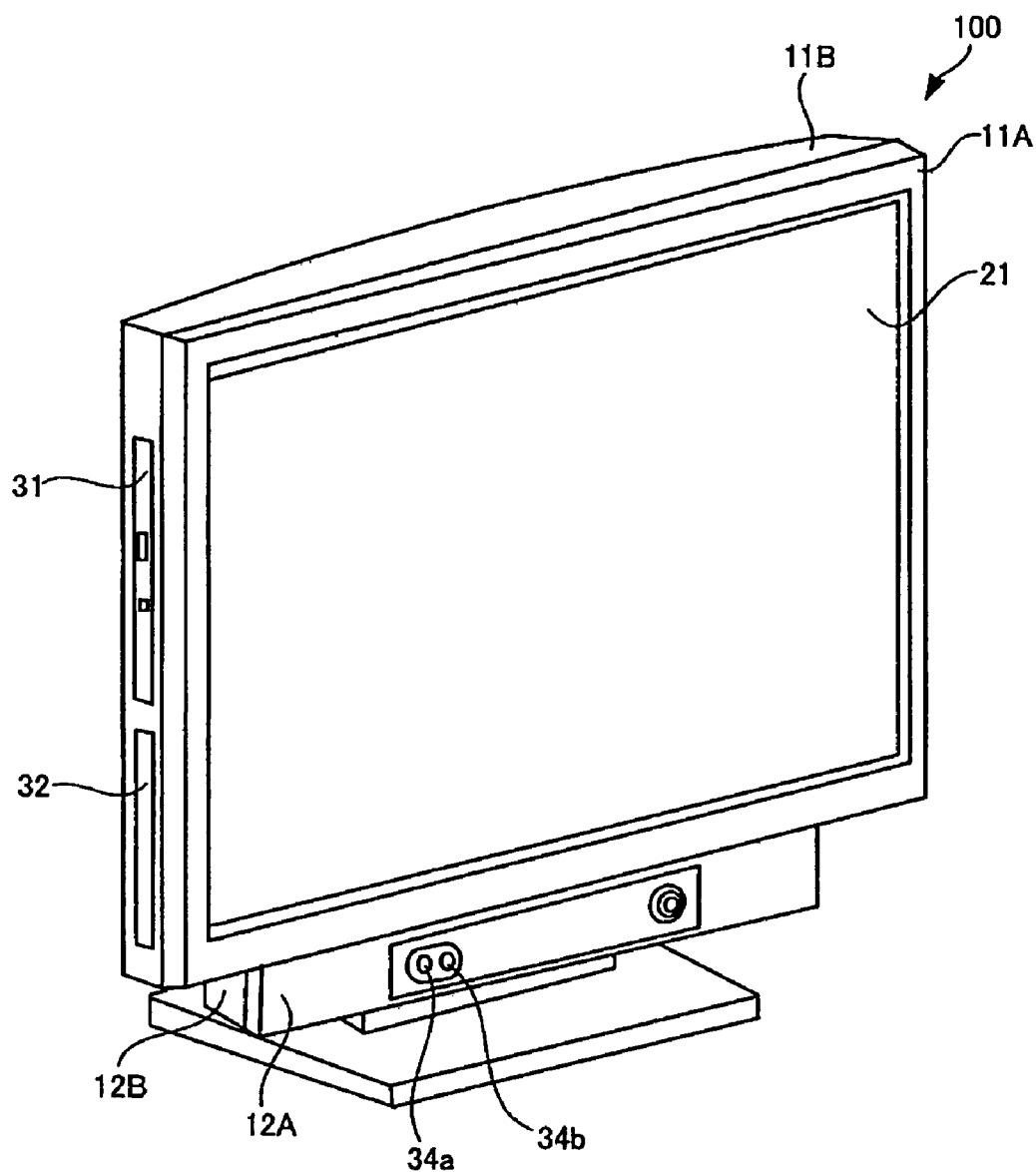
FIG. 4 is an appearance of a personal computer being a concrete first embodiment of an electronic apparatus.

FIG. 4 is an appearance of a personal computer 100 being a first concrete embodiment of an electronic apparatus.

The personal computer 100 is an integral unit which includes a display device for displaying information, a hard disk device and a CPU together in the same housing. Incidentally, although a keyboard, a mouse and the like are actually connected to the personal computer 100, they are omitted from FIG. 4.

FIG. 4 is the front perspective view of the personal computer 100. The personal computer 100 includes a liquid crystal panel on the surface of which a display screen 21 spreads, a CPU, a hard disk device, a cooling fun, a power supply device, various boards and cables for connecting the components together in the space formed by an upper front case 11A, an upper rear case 11B, a lower front case 12A and a lower rear case 12B. The combination of the upper front case 11A, the upper rear case 11B, the lower front case 12A and the lower rear case 12B corresponds to one example of the housing in the basic feature described above.

On the front face of the personal computer 100, there are provided a start switch 34a for starting the personal computer 100, a display switch 34b for displaying information on the display screen 21 and the like. On one side of the personal computer 100, there are provided an optical disk loading slot 31 for loading an optical disk such as a CD or a DVD and an FD loading slot 32 for loading a flexible disk (hereinafter, referred to as "FD").

Figure 5:
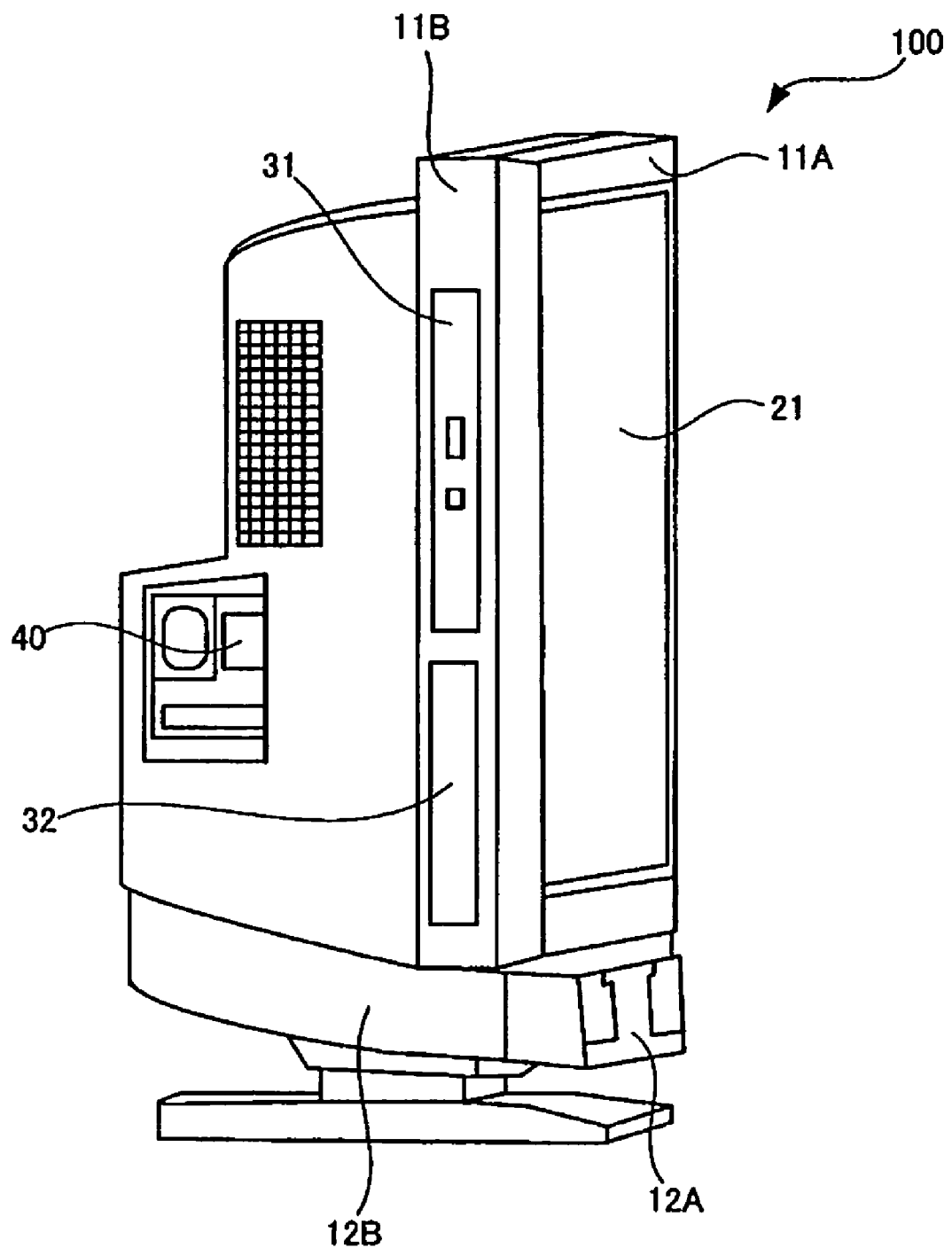
FIG. 5 is a side elevation of the personal computer.
Figure 6:
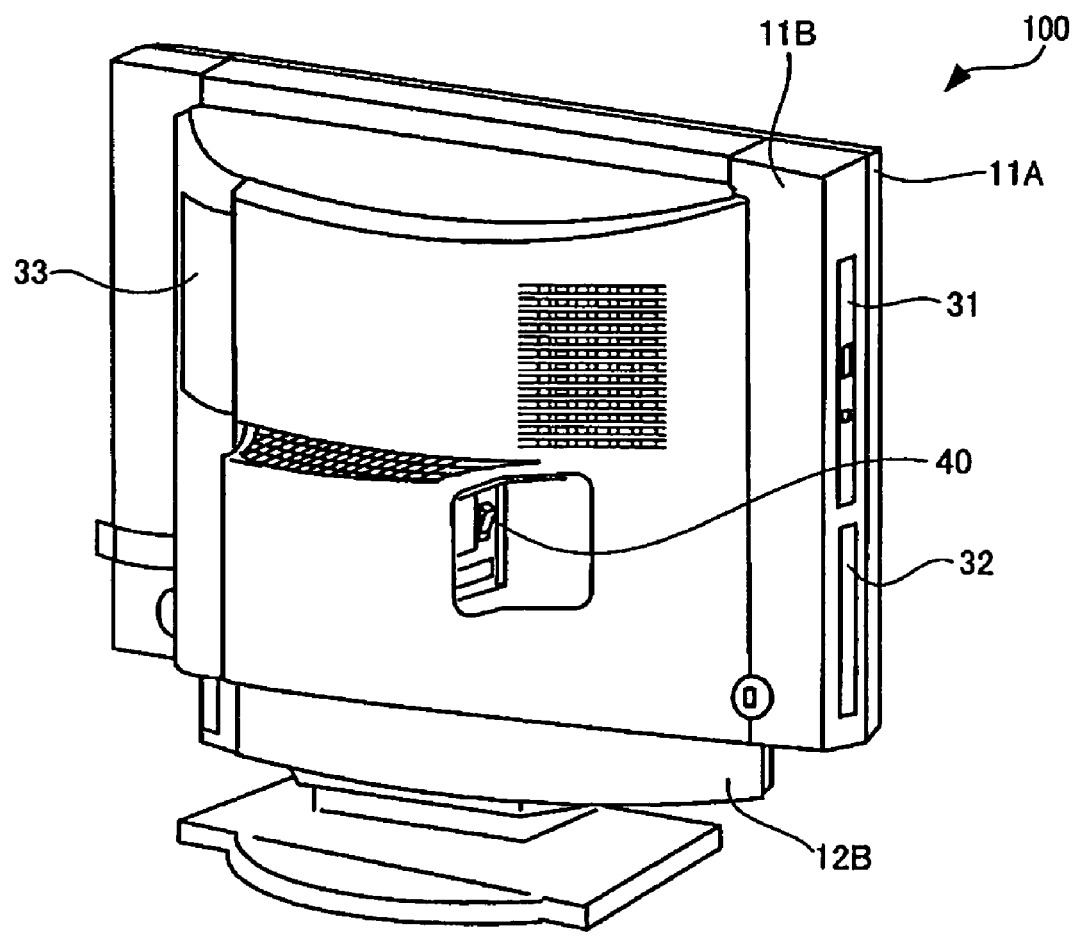
FIG. 6 is a rear elevation of the personal computer.

FIG. 5 is a side elevation of the personal computer 100 and FIG. 6 is a rear elevation of the personal computer 100.

In the personal computer 100, the upper rear case 11B is attached to the upper front case 11A and the lower rear case 12B is attached to the lower front case 12A. Into the upper front case 11A, there is fitted a liquid crystal panel with the display screen 21 in front. On the other side of the display screen 21, there is housed a hard disk device, various board and the like. On the rear face of the personal computer 100, there are provided a main power switch 40 for turning on power and an expansion card loading slot 33 for loading an expansion card for expanding functions such as a LAN card.

Figure 7:
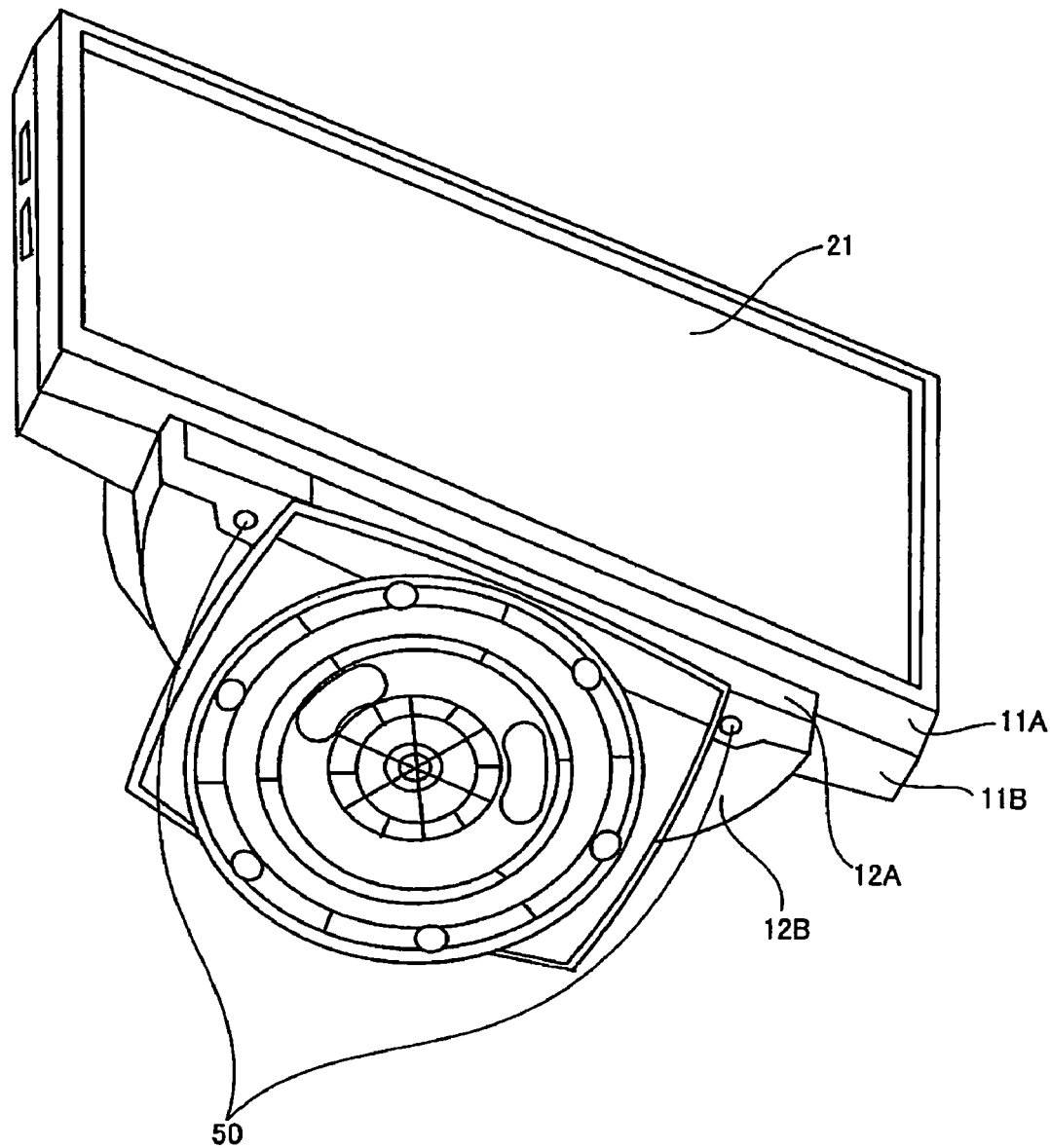
FIG. 7 is a bottom view of the personal computer.

FIG. 7 is a bottom view of the personal computer 100.

In an upper part of the inside of the personal computer 100, there is housed a replaceable hard disk device and the like. Under the inside thereof, there is housed a normally irreplaceable board and the like while being protected by the housing frame. For example, the lower front case 12A is a replaceable plastic cover. A printed circuit board is attached to a metallic housing frame (refer to FIG. 10). The housing frame is fixed to the lower front case 12A with screws 50. In the typical repair of the personal computer 100, only the upper rear case 11B is removed from the upper front case 11A and a hard disk device housed above the inside thereof is replaced.

Figure 8:
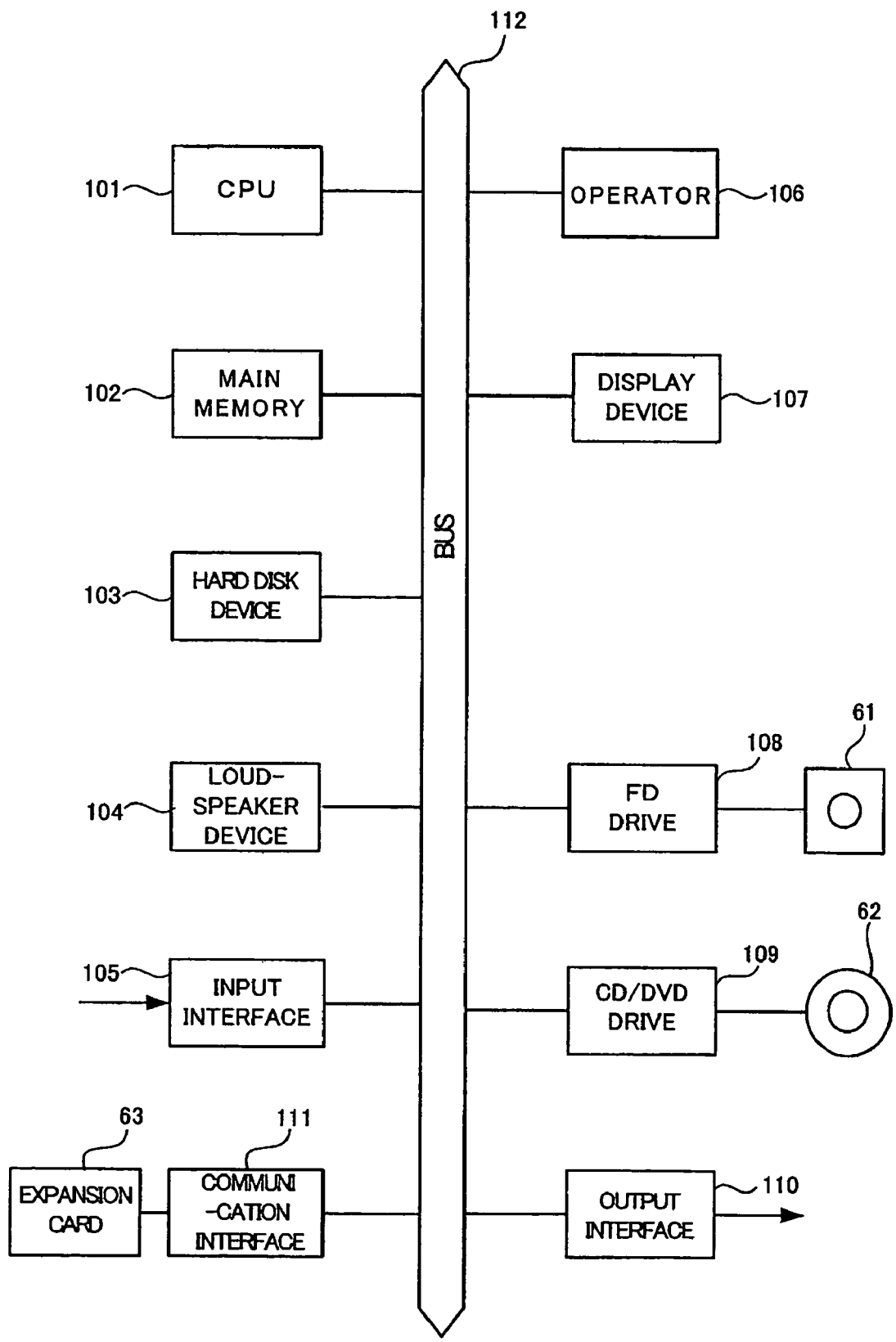
FIG. 8 is an internal block diagram of the personal computer.

FIG. 8 is an internal block diagram of the personal computer 100.

As illustrated in FIG. 8, the personal computer 100 includes a CPU 101 for executing various programs, a main memory 102 in which a program stored in a hard disk device 103 is read and developed to execute it by the CPU 101, the hard disk device 103 for storing various programs and data, a loudspeaker device 104 for generating audio signal to output an audio, an input interface 105 to which data is input from an external device, an operator 106 such as a keyboard and a track pad, a display device 107 for displaying information on the display screen 21, an FD drive 108 onto which an FD 61 is loaded and which accesses the loaded FD 61, a CD/DVD drive 109 onto which a CD-ROM 62 or a DVD is loaded and which accesses the loaded CD-ROM 62 or DVD, an output interface 110 for outputting data to an external device and a communication interface 111 for communicating using an expansion card 63. The above various elements are interconnected through a bus 112.

As described above, the personal computer 100 is formed such that electronic components such as a printed circuit board are attached to the metallic housing frame and the plastic case is further attached to the housing frame to establish compatibility between strength and appearance. A method of fixing the lower front case 12A to the housing frame will be described in detail below.

Figure 9:
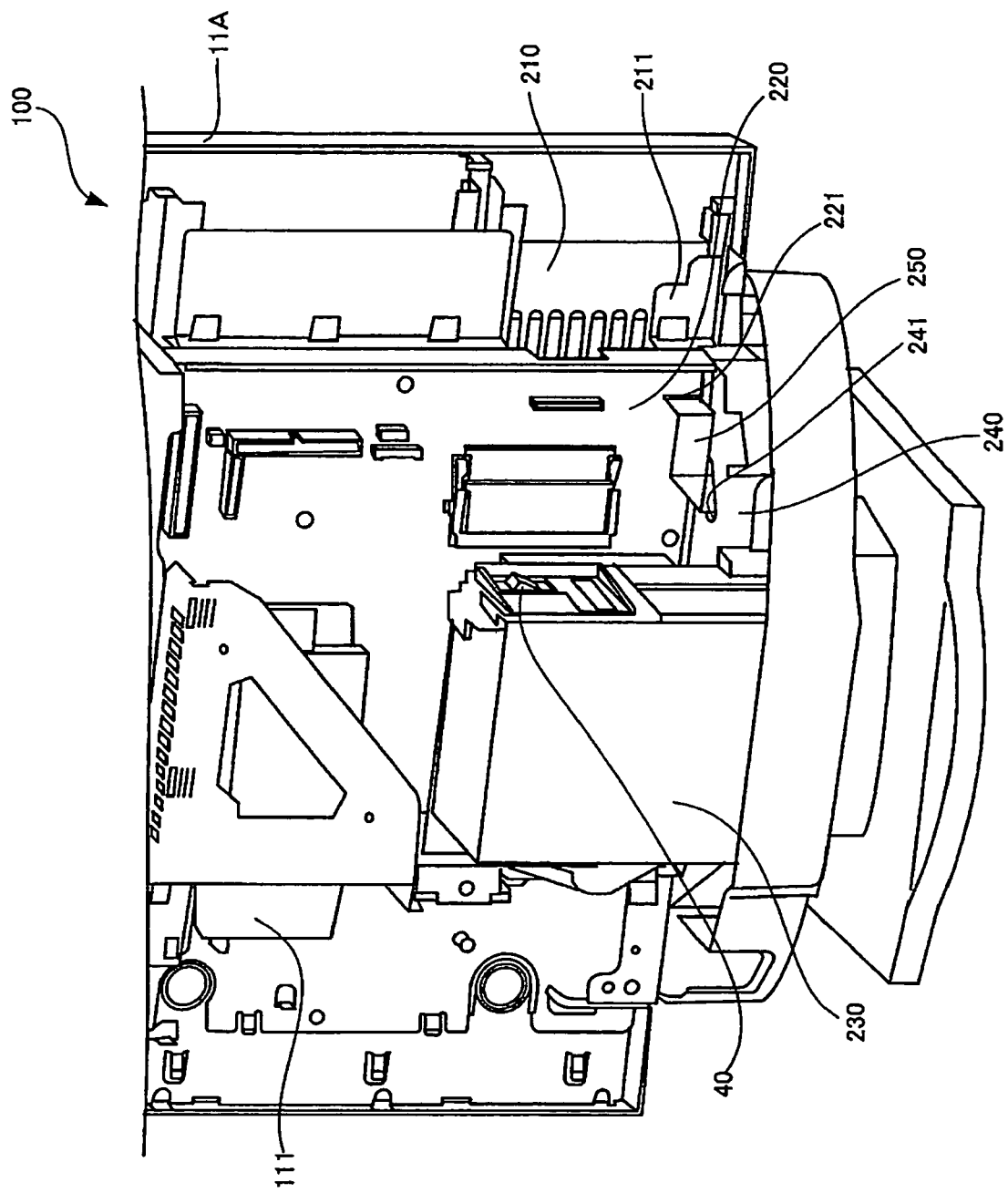
FIG. 9 is a rear view of the personal computer from which an upper rear case is removed.

FIG. 9 is a rear view of the personal computer 100 from which the upper rear case 11B is removed.

As illustrated in FIG. 9, into the upper front case 11A, there is fitted a liquid crystal panel 210 with the display screen 21 illustrated in FIG. 8 in front. On the other side of the liquid crystal panel 210, there are arranged in overlap a control board 211 for controlling the liquid crystal panel 210, a main board 220 on which the communication interface 111 and the hard disk device 103 and the like illustrated in FIG. 8 are mounted, a power supply device 230 for controlling electric power and the like. The personal computer 100 is partitioned into an upper and a lower portion by a partitioning frame 240 being part of the housing frame. Under the partitioning frame 240, there are housed a printed circuit board 260 (refer to FIG. 10) on which the loudspeaker device 104 (refer to FIG. 8), various switches 34a and 34b (refer to FIG. 4) and the like are mounted. The main board 220 is connected to the printed circuit board 260 by a wide flat cable 250 with a flat conductor. The flat cable 250 attached to the printed circuit board 260 is attached to a connector 221 provided on the main board 220 through a through hole 241 formed in the partitioning frame 240.

Figure 10:
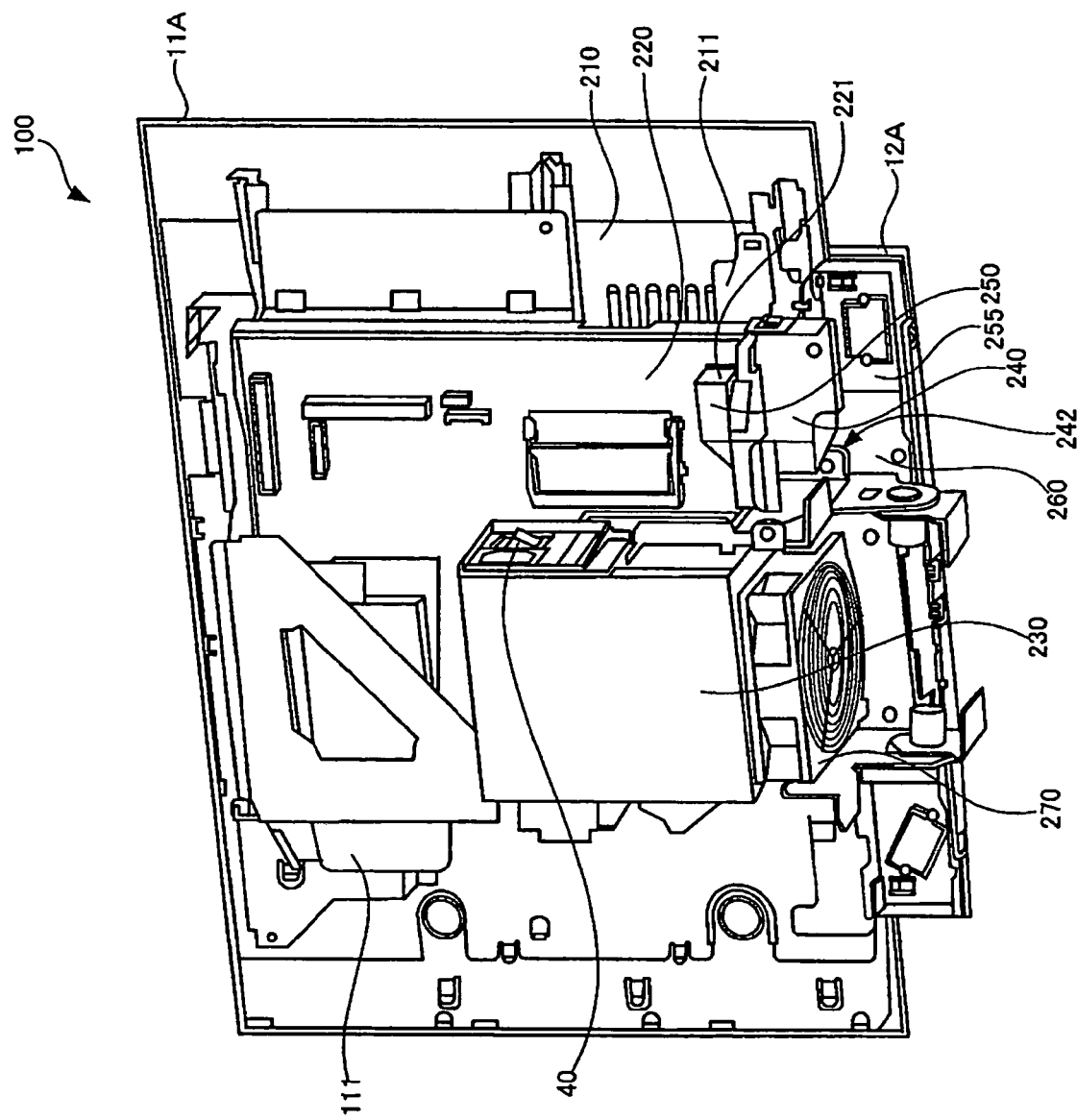
FIG. 10 is a rear view of the personal computer from which the upper rear case and the lower rear case are removed.

FIG. 10 is a rear view of the personal computer 100 from which the upper rear case 11B and the lower rear case 12B are removed.

As illustrated in FIG. 10, on the other side of the lower front case 12A, there is provided a cooling fan 270. Although not illustrated in the FIG. 10, the CPU 101 illustrated in FIG. 8 is arranged between the power supply device 230 and the cooling fan 270. Heat generated by the power supply device 230 and the CPU 101 is cooled by air introduced by the cooling fan 270. The lower front case 12A is fixed to a sheet metal frame 255 being part of the housing frame with a screw. Under the partitioning frame 240, there is housed the printed circuit board 260 fixed to the sheet metal frame 255. The flat cable 250 attached to the printed circuit board 260 is wired above the frame 240 through a recess 242 formed in the frame 240 and the through hole 241 illustrated in FIG. 9. The lower front case 12A corresponds to one example of the "first component" in the basic feature of the present invention. The sheet metal frame 255 corresponds to one example of the second component in the basic feature according to the present invention.

Figure 11:
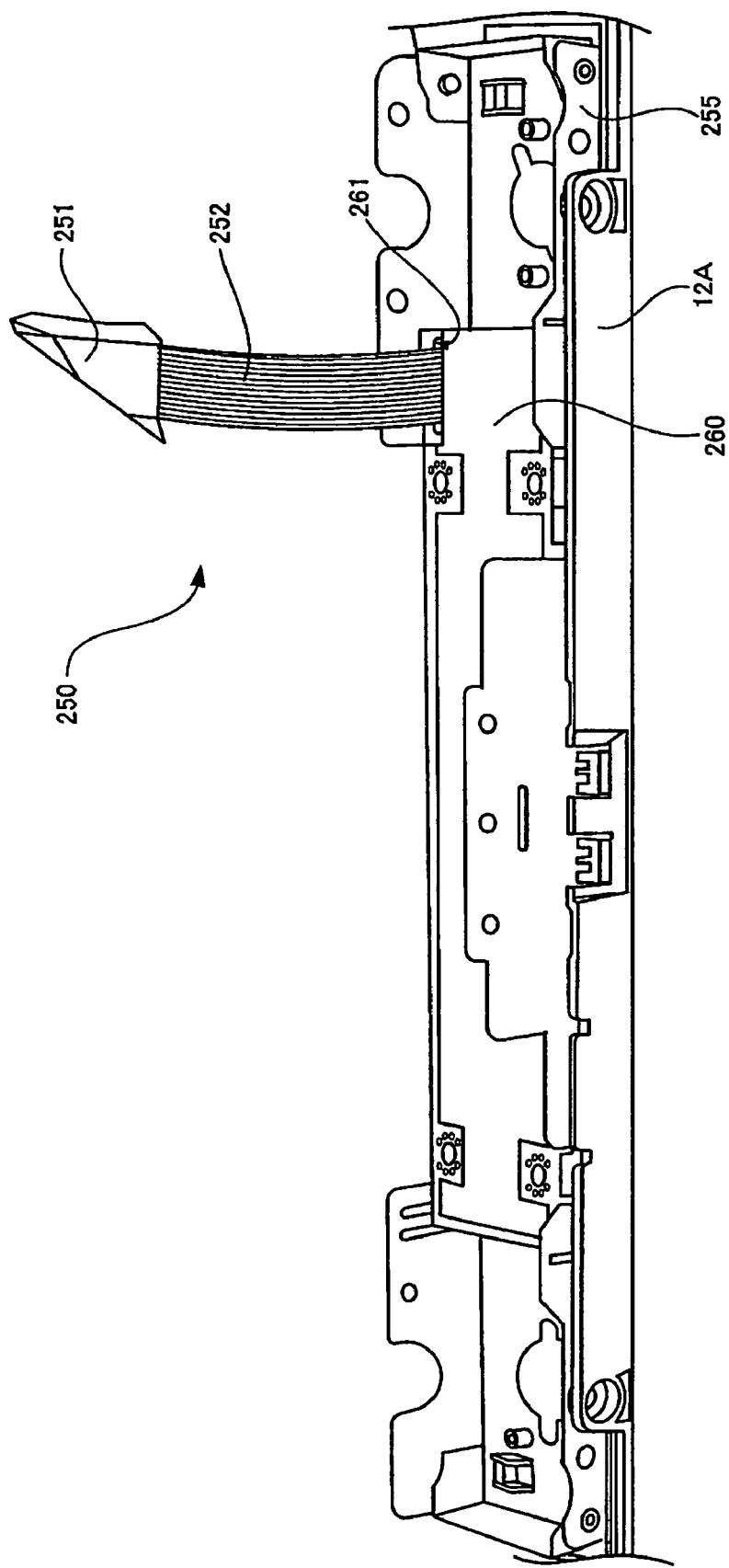
FIG. 11 is a perspective view of the sheet metal frame on which a printed circuit board is mounted and the lower front case.

FIG. 11 is a perspective view illustrating the sheet metal frame 255 on which the printed circuit board 260 is mounted and the lower front case 12A.

The printed circuit board 260 is attached to the sheet metal frame 255 with the surface on which a connector for the flat cable 250 is provided opposing the lower front case 12A. The flat cable 250 is routed such that one terminal 251 thereof is mated with a connector provided on the front face of the printed circuit board 260, a wiring section 252 thereof passes through a through hole 261 provided in the printed circuit board 260 and is extended above the frame 240 illustrated in FIGS. 9 and 10 through the other side of the printed circuit board 260 and the other terminal 251 thereof is mated with the connector 221 of the main board 220 illustrated in FIGS. 9 and 10.

On the front face of the printed circuit board 260 opposing the lower front case 12A, there are provided the start switch 34a and the display switch 34b illustrated in FIG. 4.

Figure 12:
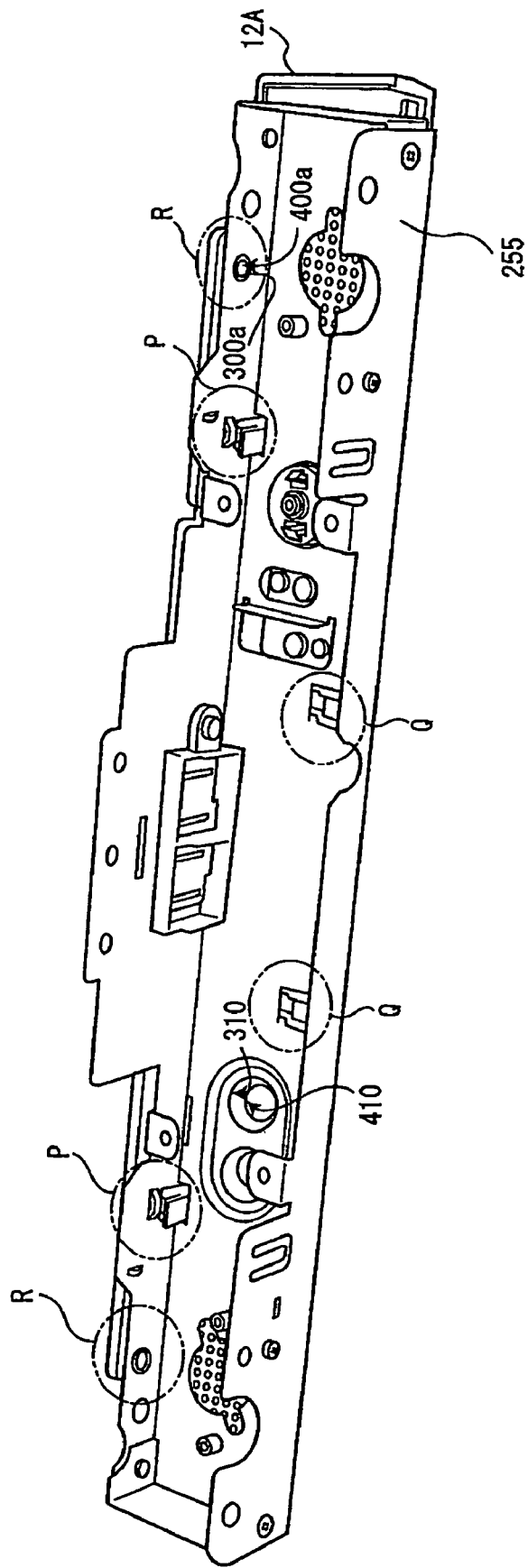
FIG. 12 is a perspective view of the sheet metal frame from which the printed circuit board is removed and the lower front case 12A.
Figure 13:
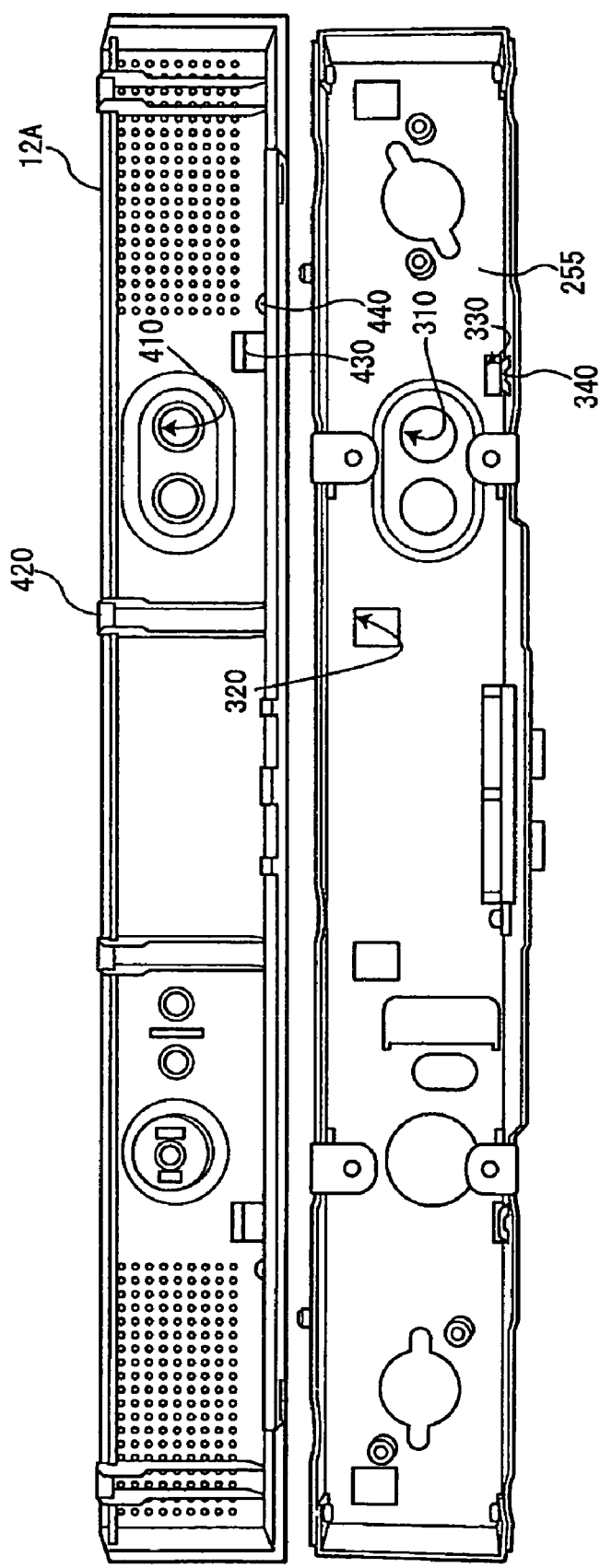
FIG. 13 is an exploded view of the sheet metal frame and the lower front case.

FIG. 12 is a perspective view illustrating the sheet metal frame 255 from which the printed circuit board 260 is removed and the lower front case 12A. FIG. 13 is an exploded view of the sheet metal frame 255 and the lower front case 12A.

As illustrated in FIG. 12, in the sheet metal frame 255 and the lower front case 12A, there are provided through holes 310 and 410 for exposing the start switch 34a and the display switch 34b provided on the printed circuit board 260 to the outside. The start switch 34a and the display switch 34b correspond to one example of the "third component" of in the additional feature of the present invention. The through hole 310 formed in the sheet metal frame 255 corresponds to one example of the "third hole" in the additional feature of the present invention. The through hole 410 formed in the lower front case 12A corresponds to one example of the "hole corresponding to the third hole" in the additional feature of the present invention.

Three fixed positions P, Q and R are prepared both on the left and the right side in the longitudinal direction of the sheet metal frame 255 and the lower front case 12A. The sheet metal frame 255 and the lower front case 12A are fixed such that firstly the lower front case 12A is tentatively fixed to the sheet metal frame 255 at two fixed positions P and Q, and then screws 50 illustrated in FIG. 7 are inserted into screw holes 300a and 400a formed at the fixed position R and tightened to fix the lower front case 12A to the sheet metal frame 255. The screw hole 300a formed in the sheet metal frame 255 corresponds to one example of the "screw hole" in the additional feature of the present invention. The screw hole 400a formed in the lower front case 12A corresponds to one example of the "screw through hole" in the additional feature of the present invention.

FIG. 13 is a rear view of the lower front case 12A and the sheet metal frame 255.

On the lower front case 12A, there are provided an upper hook 420 at the fixed position P illustrated in FIG. 12, a projection 430 projecting toward the back of the personal computer 100 and a protrusion 440 protruding upward. The upper hook 420 corresponds to one example of the "locking section" in the basic feature of the present invention. The projection 430 corresponds to one example of the "projection" in the basic feature of the present invention. The protrusion 440 corresponds to one example of the "protrusion" in the additional feature of the present invention of the present invention.

In the sheet metal frame 255, there are a hook hole 320 into which the upper hook 420 of the lower front case 12A is inserted at the fixed position Q, a projection hole 330 into which the projection 430 of the lower front case 12A is inserted, an interference section 340 for interfering with the projection 430 from the lower side and a protrusion 350 (see FIGS. 16 and 17) under which the protrusion 440 of the lower front case 12A enters at the fixed position P. The hook hole 320 corresponds to one example of the "first hole" in the basic feature of the present invention. The projection hole 330 corresponds to one example of the "second hole" in the basic feature of the present invention. The interference section 340 corresponds to one example of the "part" in the basic feature of the present invention. The protrusion 350 corresponds to one example of the "protrusion section fitted into a recess" in the additional feature of the present invention.

The various elements provided at fixed positions P and Q will be described in detail below one by one.

Figure 14:
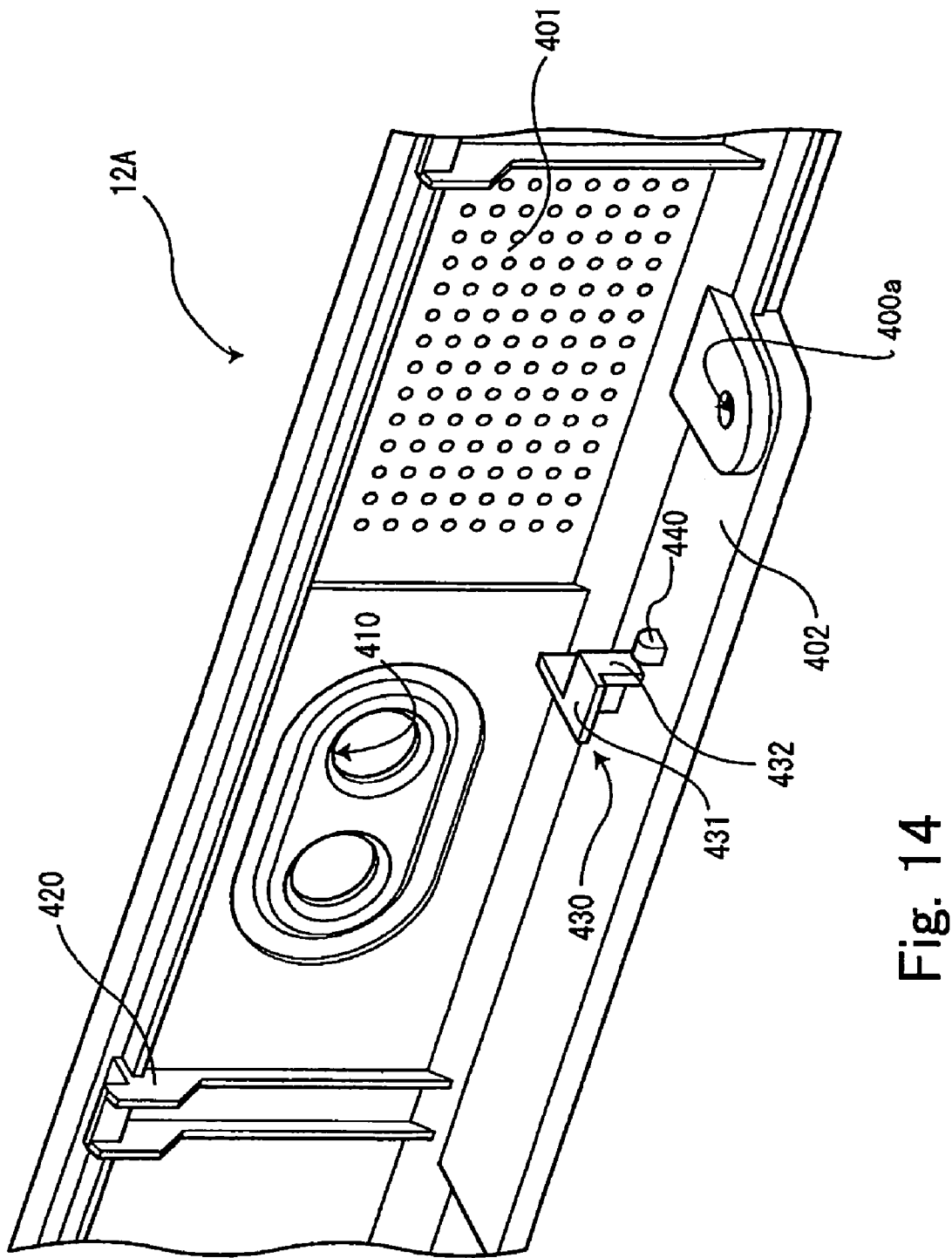
FIG. 14 is an enlarged view of the lower front case in the vicinity of the fixed position P.

FIG. 14 is an enlarged view of the lower front case 12A in the vicinity of the fixed position P.

The lower front case 12A includes a first face 401 forming the front face of the personal computer 100 and a second face 402 forming the bottom face of the personal computer 100. A screw hole 400a is formed in the second face 402. Forming the screw hole 400a in the second face 402 enables the lower front case 12A to be fixed to the sheet metal frame 255 with a screw on the bottom side of the personal computer 100, which allows improving appearance. The first face 401 corresponds to one example of the "first face of the first component" in the basic feature of the present invention. The second face 402 corresponds to one example of the "second face of the first component" in the additional feature of the present invention.

The projection 430 has a plate shaped section 431 extending perpendicularly from the first face 401 and a supporting section 432 projecting from the second face 402 and supporting the plate shaped section 431 from the lower side. The upper face of the plate shaped section 431 is parallel to the second face 402. The lower face of the plate shaped section 431 has a slope descending toward the first face 401. The plate shaped section 431 corresponds to one example of the "slope section of the first component" in the additional feature of the present invention. The supporting section 432 corresponds to one example of the "supporting section" in the additional feature of the present invention.

The protrusion 440 is provided nearby the projection 430 and protrudes upward from the second face.

Figure 15:
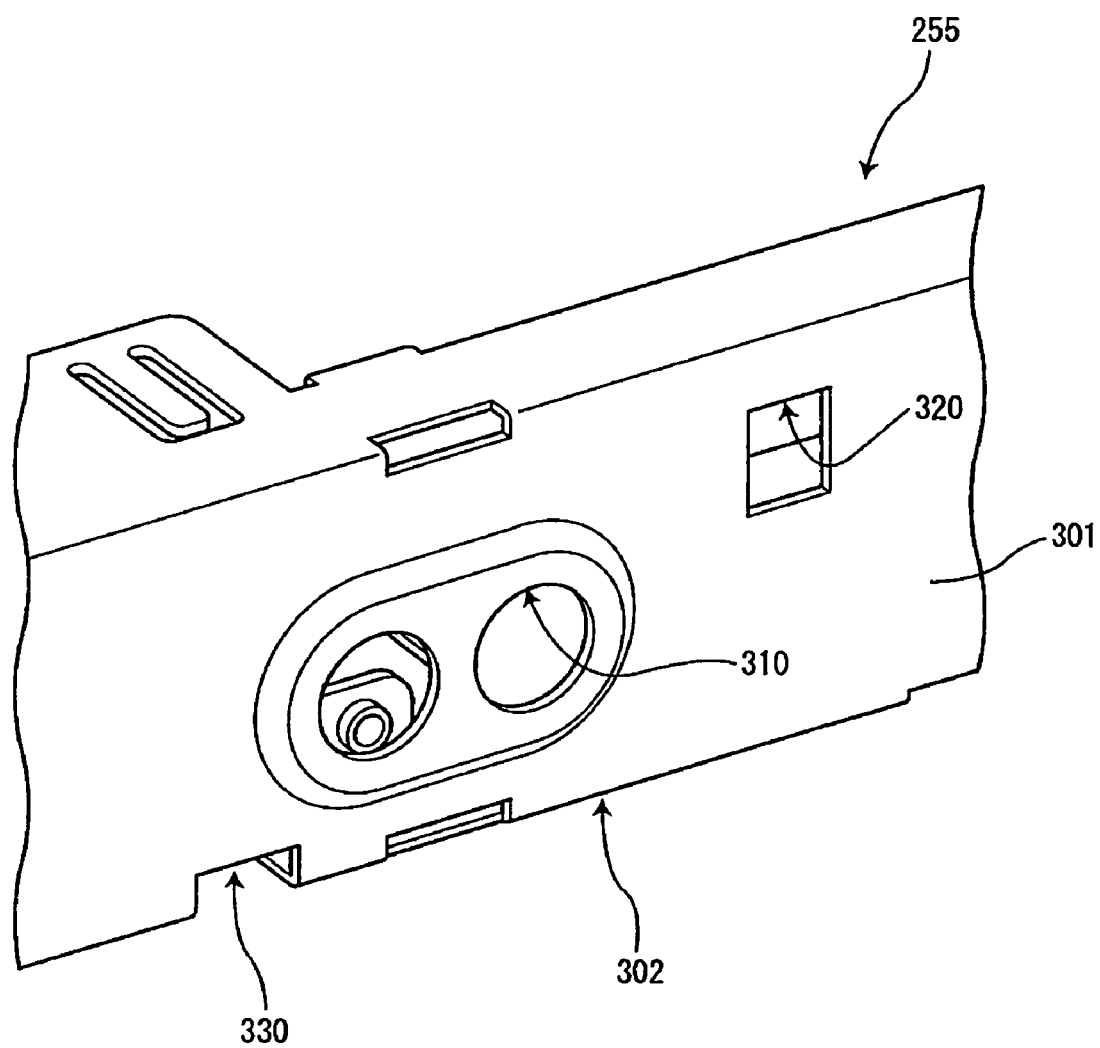
FIG. 15 is an enlarged view of the front face side of the sheet metal frame to which the lower front case is fixed.

FIG. 15 is an enlarged view of the front face side of the sheet metal frame 255 to which the lower front case 12A is to be fixed.

The sheet metal frame 255 includes a first face 301 arranged on the front side of the personal computer 100 while opposing the first face 401 of the lower front case 12A and a second face 302 arranged on the bottom face of the personal computer 100 while opposing the second face 402 of the lower front case 12A. The first face 301 corresponds to one example of the "first face of the second component" in the basic feature of the present invention. The second face 302 corresponds to one example of the "second face of the second component" in the additional feature of the present invention.

The hook hole 320 is formed larger than the upper hook 420 so that the upper hook 420 of the lower front case 12A is smoothly inserted thereinto. The projection hole 330 extends both to the first face 301 and the second face 302, so that the projection 430 of the lower front case 12A can be easily inserted into the projection hole 330.

Figure 16:
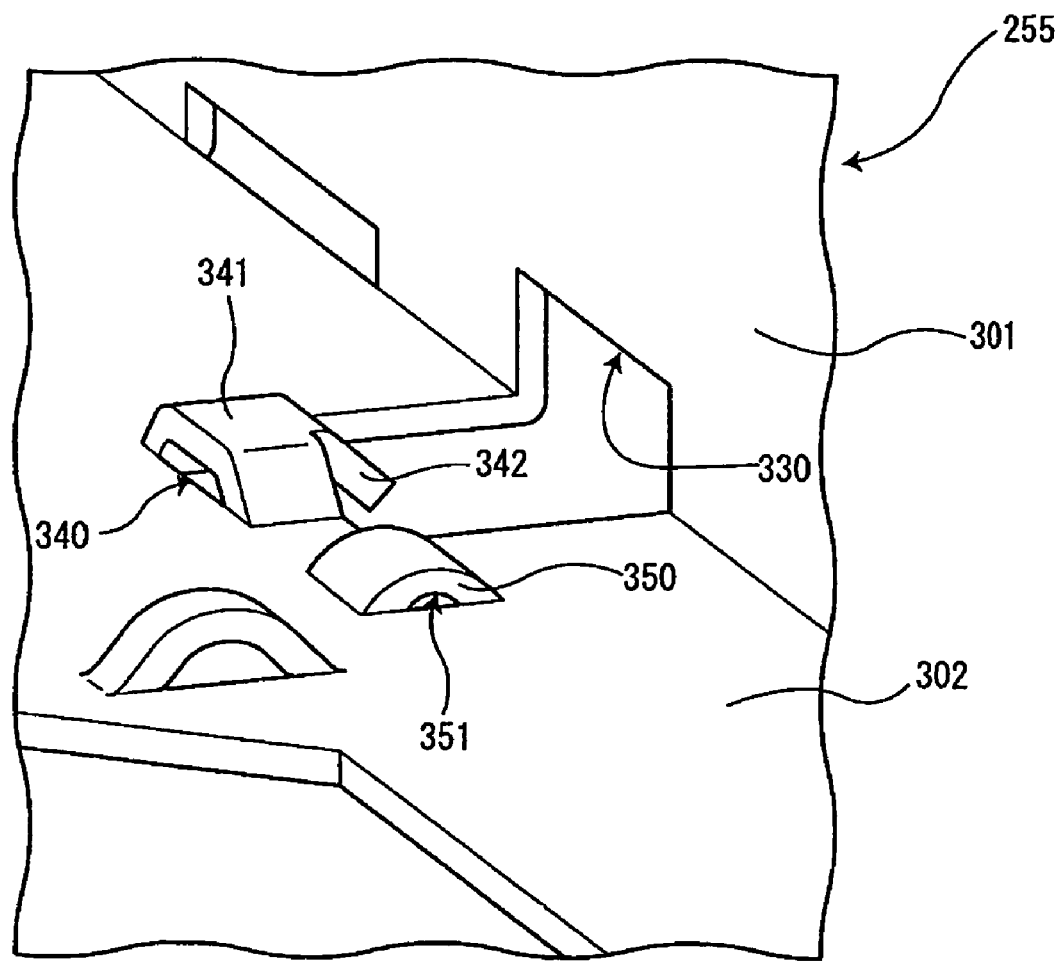
FIG. 16 is an enlarged rear view of the sheet metal frame.

FIG. 16 is an enlarged rear view of the sheet metal frame 255.

As illustrated in FIG. 16, the interference section 340 of the sheet metal frame 255 is formed of a platform section 341 projected from the second face 302 and a slope section 342 extending from the platform section 341 and descending toward the first face 301. The slope section 342 corresponds to one example of the "slope section of the second component" in the basic feature of the present invention. The platform section 341 corresponds to one example of the "portion regulating the displacement of a projection of the first component" in the additional feature of the present invention.

The protrusion 350 is provided on the second face 302 and protrudes upward, and the bottom face 351 thereof enters the inside.

Figure 17:
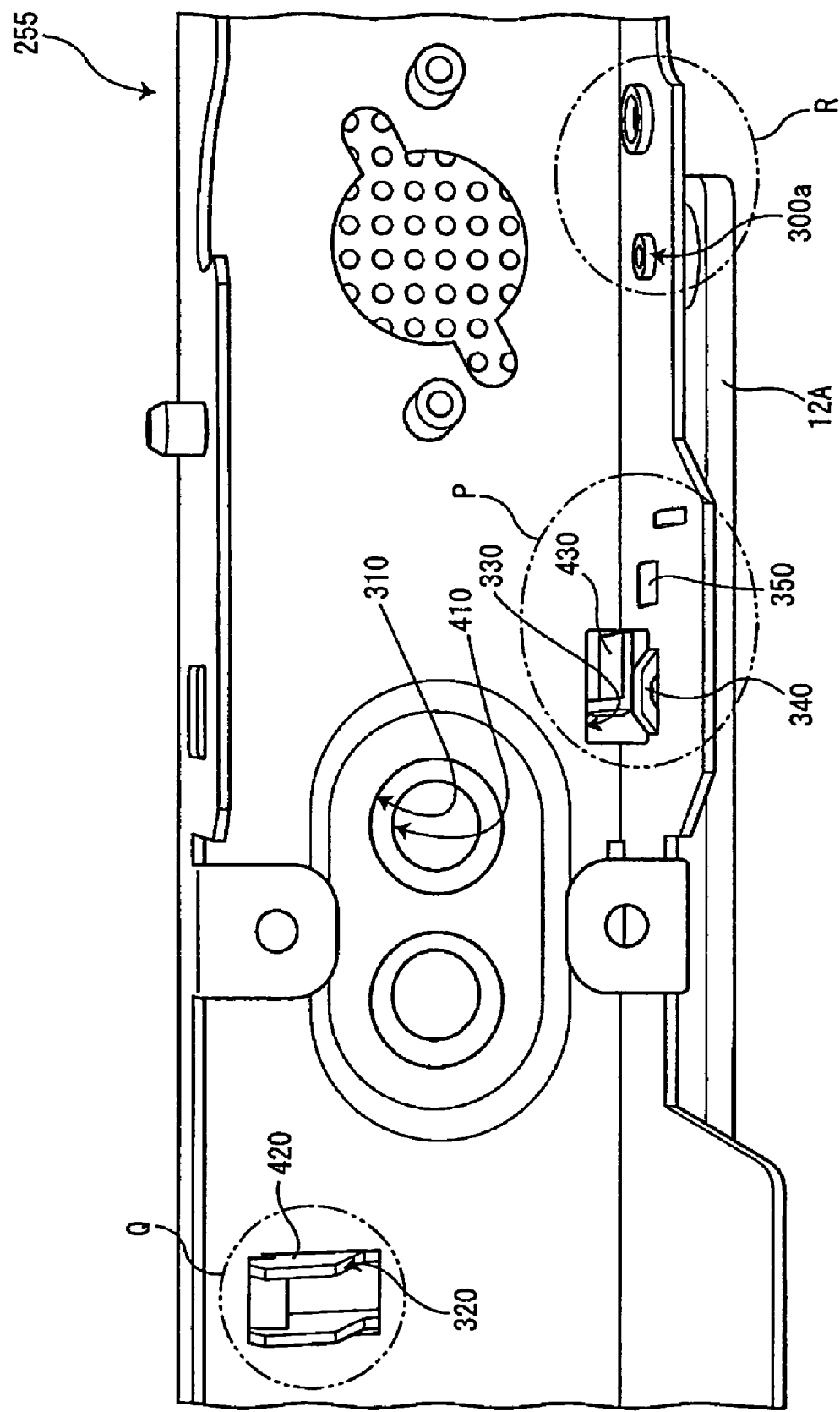
FIG. 17 is an enlarged view of the sheet metal frame, to which the lower front case is fixed, in the vicinity of the fixed positions P, Q and R.

FIG. 17 is an enlarged view of the sheet metal frame 255, to which the lower front case 12A is fixed, in the vicinity of the fixed positions P, Q and R.

As illustrated in FIG. 17, the upper hook 420 of the lower front case 12A is engaged in the hook hole 320 of the sheet metal frame 255 at the fixed position Q. The projection 430 of the lower front case 12A is inserted into the projection hole 330 of the sheet metal frame 255 and abuts the interference section 340 at the fixed position P.

Figure 18:
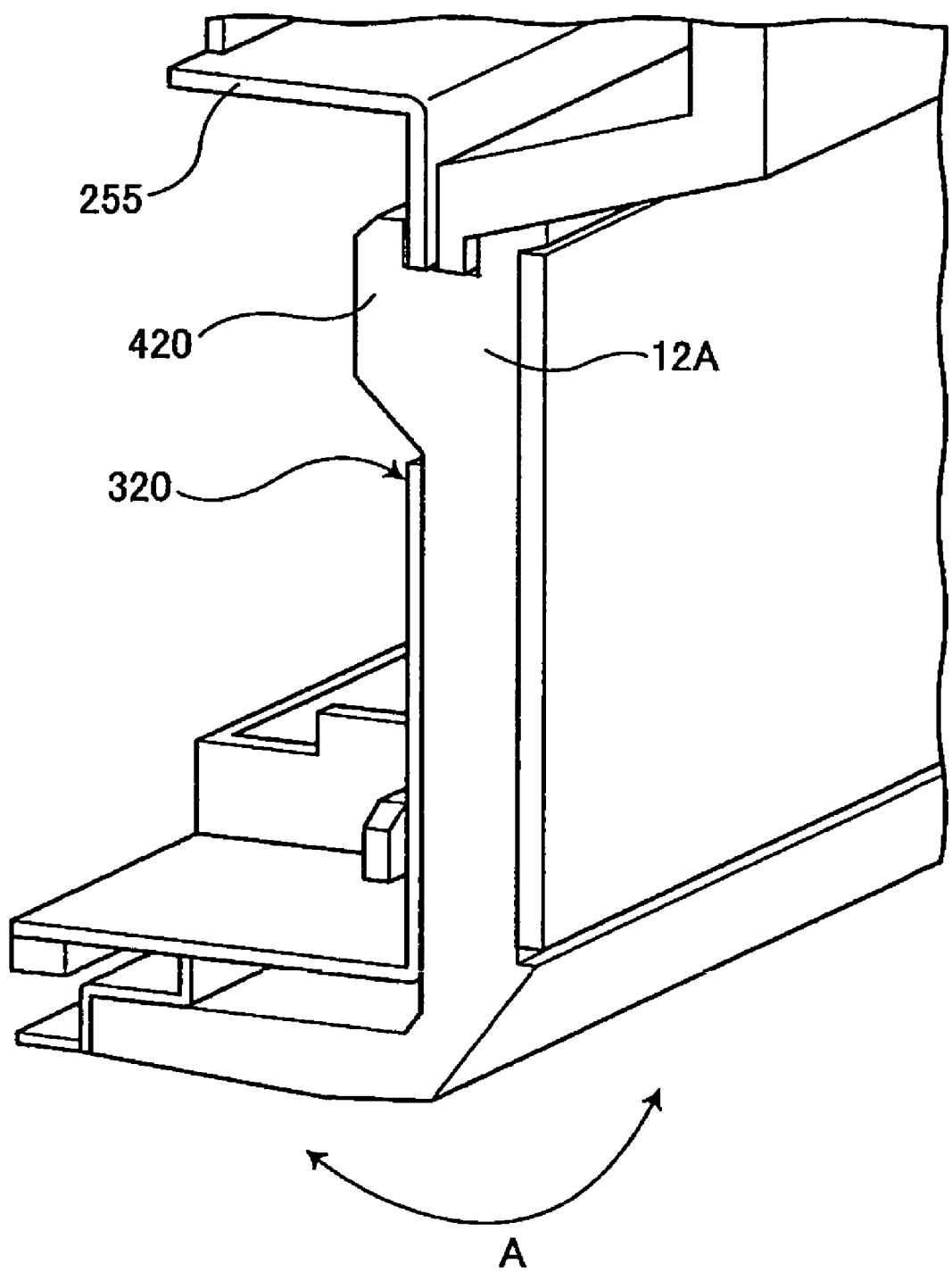
FIG. 18 is a cross section of a portion where the upper hook of the lower front case is engaged with the hook hole of the sheet metal frame.

FIG. 18 is a cross section of a portion where the upper hook 420 of the lower front case 12A is engaged in the hook hole 320 of the sheet metal frame 255.

As illustrated in FIG. 18, since the hook hole 320 is formed larger than the upper hook 420, the upper hook 420 is loosely engaged in the hook hole 320. Before the fixed position P is fixed, the lower front case 12A can be rotated in the arrow direction A with the upper hook 420 being engaged in the hook hole 320.

Figure 19:
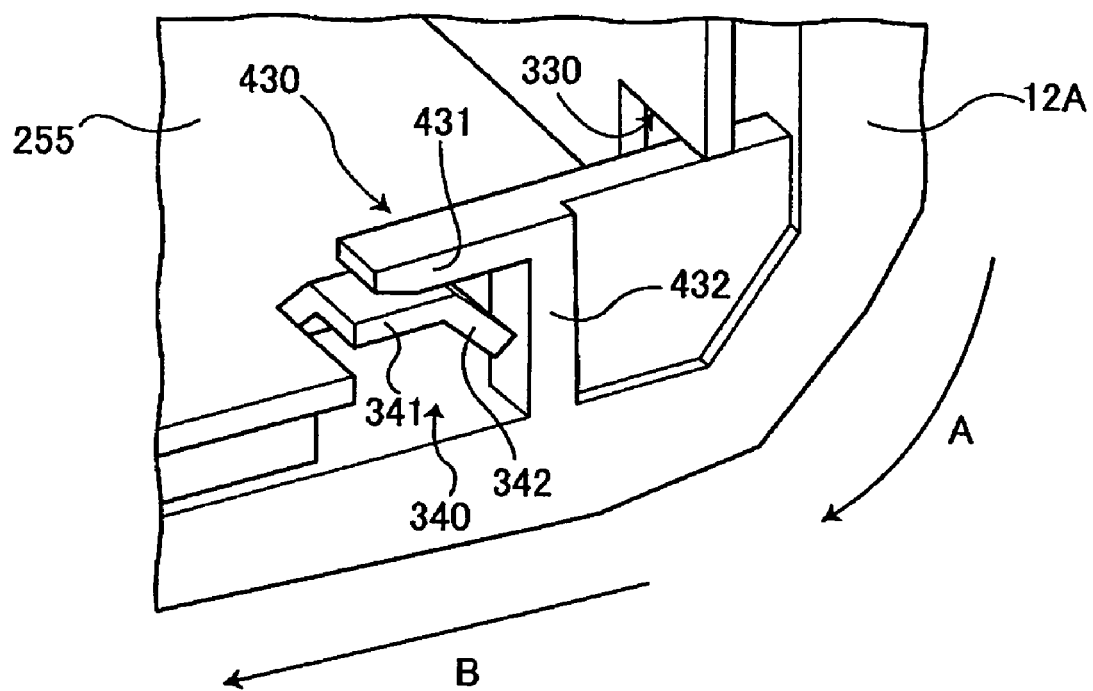
FIG. 19 is a cross section of a portion where the projection of the lower front case is engaged with the projection hole of the sheet metal frame.

FIG. 19 is a cross section of a portion where the projection 430 of the lower front case 12A is engaged in the projection hole 330 of the sheet metal frame 255.

The lower front case 12A is rotated in the arrow direction A to cause the slope section 342 of the sheet metal frame 255 to push the plate shaped section 431 of the lower front case 12A upward with the lower front case 12A being moved in the arrow direction B. The direction in which the lower front case 12A is pushed upward corresponds to one example of the "first direction" in the basic feature of the present invention.

The lower face of the plate shaped section 431 provided on the projection 430 of the lower front case 12A has a slope descending toward the front thereof, so that the lower front case 12A is further rotated in the arrow direction B to cause the platform section 341 of the sheet metal frame 255 to enter the lower side of the plate shaped section 431 of the lower front case 12A to interfere therewith, regulating the displacement of the lower front case 12A.

Figure 20:
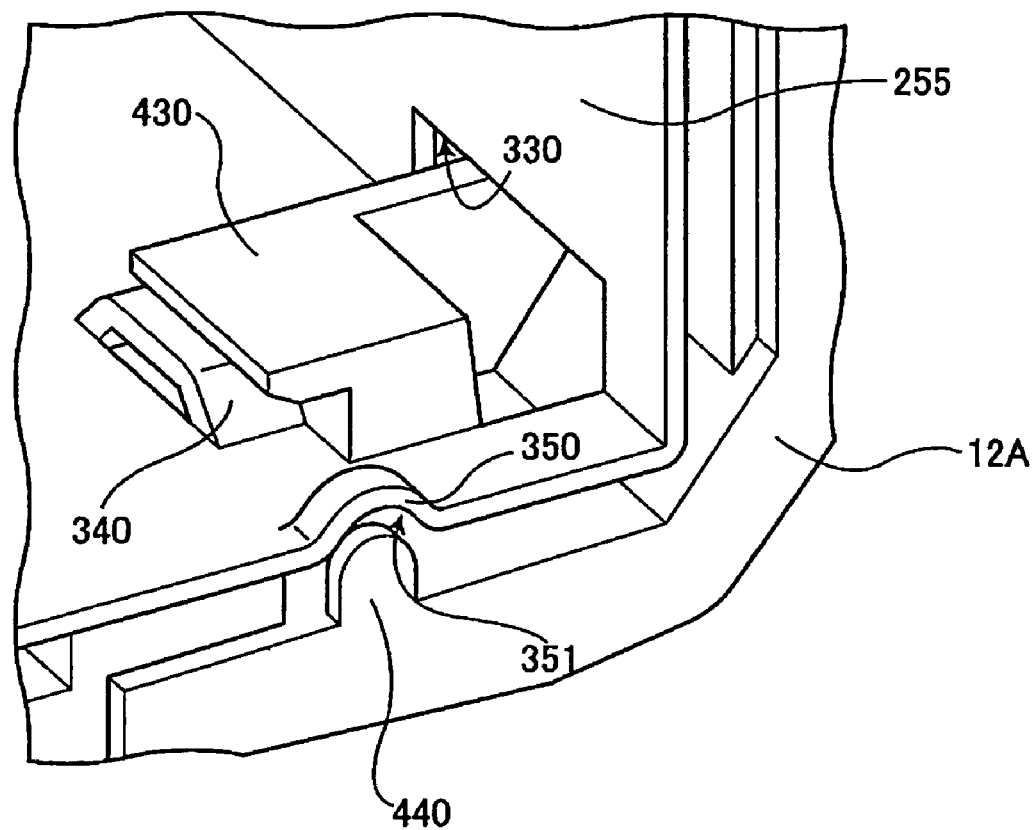
FIG. 20 is a cross section of the protrusion of the sheet metal frame.

FIG. 20 is a cross section of the protrusion 350 of the sheet metal frame 255.

The bottom face 351 of the protrusion 350 of the sheet metal frame 255 is recessed inside. The protrusion 440 of the lower front case 12A is fitted to the recess section.

Figure 21:
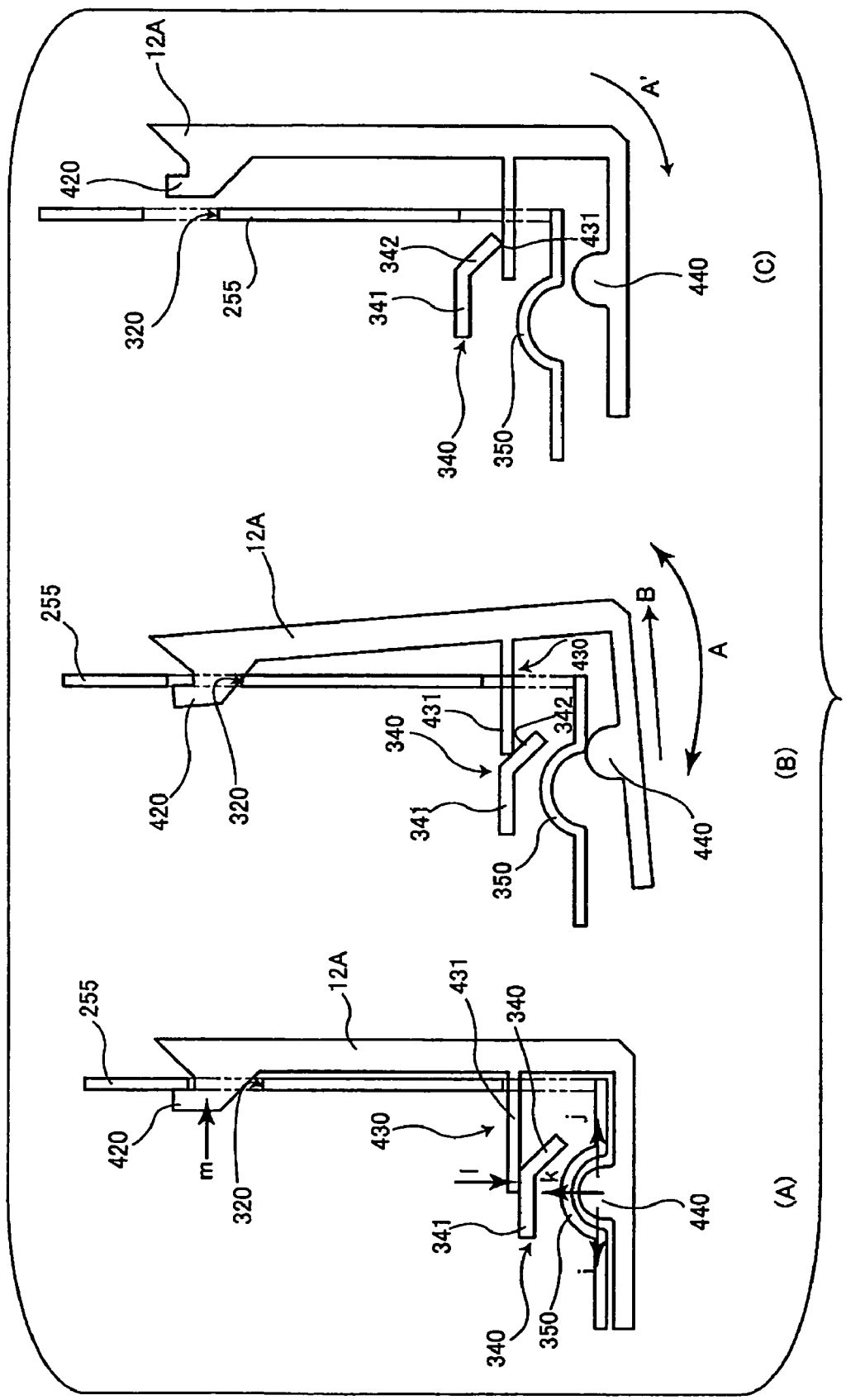
FIG. 21 is a schematic diagram for describing a method of attaching the lower front case to or detaching the lower front case from the sheet metal frame.

FIG. 21 is a schematic diagram for describing a method of attaching the lower front case 12A to or detaching the lower front case from the sheet metal frame 255.

As illustrated in Part (A) of FIG. 21, when the lower front case 12A is attached to the sheet metal frame 255, the engagement of the upper hook 420 with the hook hole 320 presses the sheet metal frame 255 in the arrow direction "m" and the abutment of the plate shaped section 431 of the lower front case 12A on the platform section 341 of the sheet metal frame 255 presses the plate shaped section 431 of the lower front case 12A in the arrow direction "l". In addition, the protrusion 440 of the lower front case 12A is fitted to the protrusion 350 of the sheet metal frame 255 to cause the protrusion 440 of the lower front case 12A to press the sheet metal frame 255 in the arrow directions i, j and k. Thus, the lower front case 12A is surely fixed to the sheet metal frame 255. Tightening the screws 50 in this condition prevents erroneous attachment and the like.

As illustrated in Part (B) of FIG. 21, a force is applied to the lower front case 12A in the arrow direction B to move the plate shaped section 431 of the lower front case 12A downward along the slope section 342 of the sheet metal frame 255 to detach the protrusion 440 of the lower front case 12A from the protrusion 350 of the sheet metal frame 255, thereby rotating the lower front case 12A around the upper hook 420 in the arrow direction A. At this time, an excessive force is not applied to the upper hook 420 of the lower front case 12A and the interference section 340 formed of plastics material low in strength to enable a smooth attachment/detachment and the prevention of wear and damage. Thus, according to the present embodiment, the lower front case 12A can be repetitively attached and detached.

When the lower front case 12A is attached to the sheet metal frame 255, as illustrated in Part (C) of FIG. 21, even if the lower front case 12A is attempted to rotate in the arrow direction A' in the condition that the upper hook 420 is incorrectly inserted into the hook hole 320, the plate shaped section 431 of the lower front case 12A enters under the slope section 342 of the sheet metal frame 255, as a result, the lower front case 12A cannot be pressed upward any more. In the present embodiment, as illustrated in FIG. 7, since the screw holes 300a and 400a used for fixing the lower front case 12A to the sheet metal frame 255 with the screws are formed in the same bottom side of the personal computer 100 as the protrusions 350 and 440, the screw holes 300a and 400a do not communicate with each other in the condition of Part (C) of FIG. 21, resultantly, the screws cannot be tightened. Thus, in the present embodiment, it is possible to surely prevent the lower front case 12A from being erroneously attached to the sheet metal frame 255.

Although the personal computer is taken as one example of the electronic apparatus described in "SUMMARY OF THE INVENTION" herein, the electronic apparatus may be a television receiver, a cellular phone or the like as long as it is such an apparatus that attaches a cover to a housing frame.

What is claimed is:

1. A component assembly comprising:
    a first component including a locking section and a flat-plate shaped projection which are formed on a first surface of the first component, the locking section extending from the first face and bending in a first direction, and the projection extending perpendicularly to the first face and formed of a face intersecting the first direction; and
    a second component that includes a first hole and a portion which are formed on a first face of the second component, the first hole into which the locking section of the first component is inserted and locked, and the portion into which the projection of the first component is inserted, the first face of the second component opposing the first face of the first component, and that includes a part with a slope section on which a distal end of the projection of the first component abuts and which moves the first component in the first direction when the first component is attached to the second component, the part being arranged at a position where a side face of the projection abuts on an edge on a side of the first direction of the slope section.

2. The component assembly according to claim 1, wherein the distal end of the projection of the first component has a slope section in such a shape that the slope section rubs on the slope section of the second component when the first component is attached to the second component.

3. The component assembly according to claim 1, wherein the portion into which the projection of the first component is inserted is a second hole larger in size than the projection of the first component, and
    the part of the second component has a portion which regulates the movement of the projection against the entering of the projection of the first component from a predetermined direction.

4. The component assembly according to claim 3, wherein the second component includes a second face which makes a predetermined angle with the first face of the second component and follows the first face, and
    the second hole extends to the first and the second faces of the second component.

5. A component assembly comprising:
    a first component that includes a locking section and a flat-plate shaped projection which are formed on a first surface of the first component, the locking section extending from the first face and bending in a first direction, the projection extending perpendicularly to the first face and formed of a face intersecting the first direction, and a second face which makes a predetermined angle with the first face of the first component and follows the first face and a protrusion which protrudes toward the inside of the second face, and
    a second component that includes a first hole and a second hole which are formed on a first face of the second component, the first hole into which the locking section of the first component is inserted and locked, the second hole into which the projection of the first component is inserted, the first face of the second component opposing the first face of the first component, that includes a part with a slope section on which a distal end of the projection of the first component abuts and which moves the first component in the first direction when the first component is attached to the second component, that includes a second face which makes the same angle as the predetermined angle of the first component and follows the first face, and that includes a recess which is formed on the second face of the second component and in which the protrusion formed on the second face of the first component is engaged when the first component is attached to the second component.

6. The component assembly according to claim 5, wherein the first component includes a screw insertion hole in the second face of the first component, and
    the second component includes a screw hole at a position in the second face of the second component corresponding to the screw insertion hole of the first component.

7. The component assembly according to claim 1, wherein the first component further includes a second face which makes a predetermined angle with the first face of the first component and follows the first face, and the first component also includes, in addition to the projection, a supporting section which projects toward the inside of the second face to support the projection.

8. The component assembly according to claim 1, wherein the second component includes a third hole, through which a third component appears, in the first face of the second component, and the first component includes a hole at a position in the first face of the first component corresponding to the third hole when the first component is attached to the second component.

9. The component assembly according to claim 1, wherein the first component is made of resin, and
    the second component is made of metal.

10. An electronic apparatus comprising:
    the component assembly according to claim 1 as part of the housing of the electronic apparatus,
    wherein the second component is a housing frame, and
    the first component is a cover fixed to the housing frame.

11. The component assembly according to claim 1, wherein the part of the second component includes a portion on which a portion on the side of the first direction of the projection of the first component abuts to separate the locking section of the first component from the first hole.

12. The component assembly according to claim 1, wherein the first component is arranged to face the locking section in an edge of the first direction, and includes a slope section to slide the first component when the first component is attached to and detached from the second component.

* * * * *